V. J. SHEPARD.
RESILIENT DRIVING CONNECTION.
APPLICATION FILED APR. 5, 1917.

1,362,048.

Patented Dec. 14, 1920.

WITNESSES:
Fred. A. Lind.
W. B. Wells.

INVENTOR
Victor J. Shepard
BY
Wesley G. Carr
ATTORNEY

UNITED STATES PATENT OFFICE.

VICTOR J. SHEPARD, OF PITTSBURGH, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

1,362,048.   Specification of Letters Patent.   Patented Dec. 14, 1920.

Application filed April 5, 1917. Serial No. 160,054.

*To all whom it may concern:*

Be it known that I, VICTOR J. SHEPARD, a citizen of the United States, and a resident of Pittsburgh, in the county of Allegheny and State of Pennsylvania, have invented a new and useful Improvement in Resilient Driving Connections, of which the following is a specification.

My invention relates to resilient driving connections between driving and driven members and particularly to resilient driving connections for service between the propelling motors and the driving wheels of electric railway vehicles.

One object of my invention is to provide a resilient driving connection between a driving and a driven member which shall have the internal bearing surface thereof sealed against the admission of dirt and foreign substances and be rugged and economical in construction.

Another object of my invention is to provide a resilient driving connection which shall embody a plurality of wedge members and a plurality of spring members that are disposed between the driving and the driven members of the driving connection.

A further object of my invention is to provide a resilient driving connection of the above indicated character which shall cushion the driving member upon the driven member during a limited relative movement of rotation between said members and then rigidly connect the two members together.

In electric railway vehicles, and especially in electric locomotives, it is essential to provide some cushioning means between the propelling motors and the driving wheels in order to relieve all driving members of any unnecessary blows or shocks which may be delivered by the motors thereof. In a driving connection constructed in accordance with my invention, a quill member is disposed adjacent to a driven member, which, in the example illustrated, comprises a driving wheel of a locomotive and is connected thereto by a plurality of cushioned wedge members.

Figure 2:
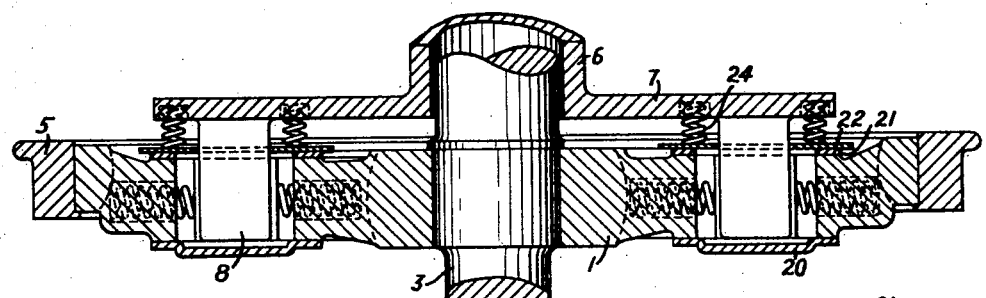
Figure 3:
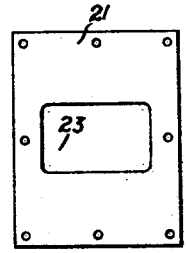
Figure 1:
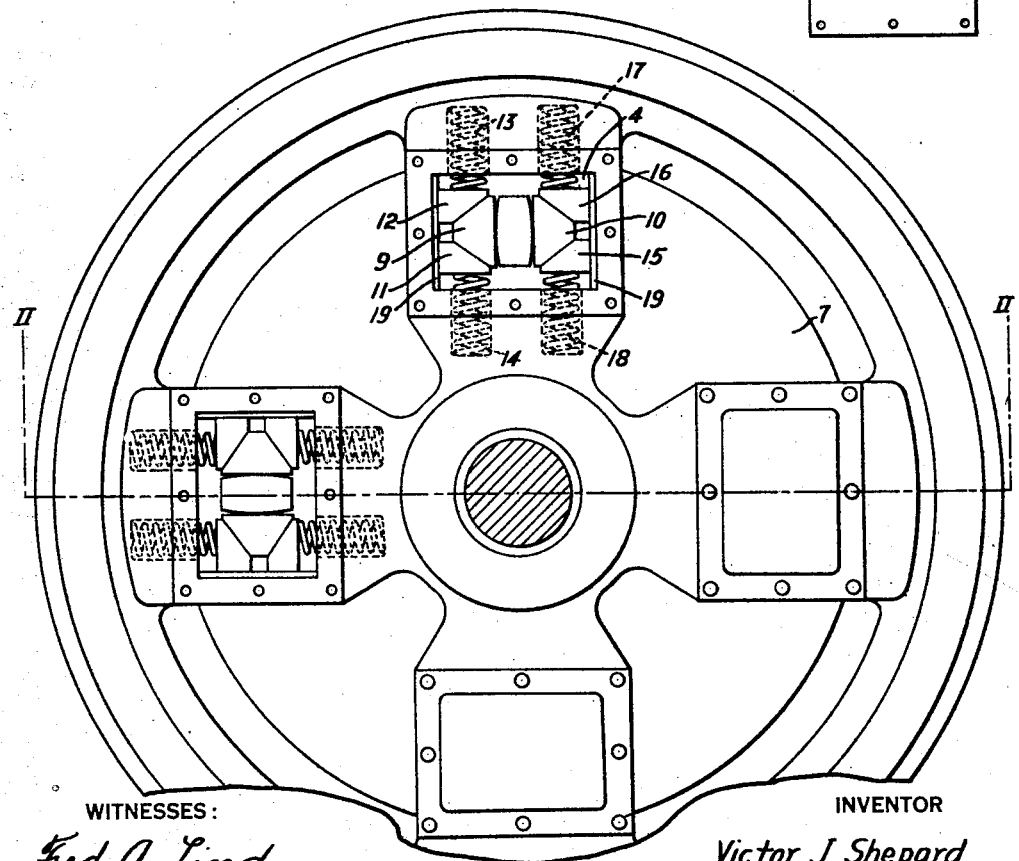

In the accompanying drawing, Figure 1 is a partial side elevational view of a driving connection constructed in accordance with my invention; Fig. 2 is a sectional view of a driving connection illustrated in Fig. 1; and Fig. 3 is a plan view of one of the inside plates illustrated in Figs. 1 and 2 of the drawing.

Referring to the drawing, the driving connection embodies a driving wheel 1 which is rigidly mounted on an axle 3 and is provided with openings 4 extending therethrough for a purpose to be described later. A quill member 6 is loosely mounted upon the axle 3 and is provided with a disk 7 which is disposed adjacent to the driving wheel 1. A plurality of arms 8 project laterally from the disk 7 and are disposed within the openings 4 of the driving wheel 1.

Within each opening 4, two wedge members 9 and 10 are disposed adjacent to the arm 8. Two wedge members 11 and 12, which coöperate with springs 13 and 14, are disposed adjacent to the wedge member 9, and two wedge members 15 and 16, which coöperate with springs 17 and 18, are disposed adjacent to the wedge member 10. Within the openings 4 are also provided two bearing plates 19 against which the wedges 11, 12, 15 and 16 abut.

The openings 4 are sealed on the front side of the driving wheel by means of outside plates 20, which may be attached to the driving wheel in any convenient manner, and the openings 4 are sealed on the rearside of the gear wheel by means of the inside plates 21 and the sealing plates 22. The inside plates are bolted or riveted to the gear wheel and each is provided with an opening 23 sufficiently wide to avoid interference with the movement of the arm 8 associated therewith. The sealing plates 22 are provided with openings similar to the openings 23 in the inside plates but much smaller in size in order to fit snugly around the arms 8. The sealing plates 22 are held in place by means of a plurality of springs 24 which are mounted in the disk 7, as illustrated in Fig. 2 of the drawing.

In case it is desired to operate the driving wheel 1 in a forward or in a reverse direction, power is applied to the quill 6, which, in turn, is transmitted to the arms 8 and various wedge members to the driving wheel 1. When the quill 6 is rotated in a forward or in a reverse direction, the arms 8 will be forced against the wedges 9 or the wedges 10, which, in turn, will operate on the wedges 11 and 12 and springs 13 and 14 or the wedges 15 and 16 and springs 17 and 18. The springs 13 and 14 or the springs 17 and 18, according to the direction of movement of the quill 6, are compressed until the wedges 9 or the wedges 10 engage one of the bearing plates 19, when a rigid connection is established between the quill member 6 and the driving wheel 1. A rigid connection between the quill member and the driving wheel may also be established by the wedge members 11 and 12 or the wedge members 15 and 16 engaging the top and the bottom of the openings 4. Moreover, a rigid connection between the quill member and the driving wheel may be effected by so designing the springs that the same are compressed solid before the wedges 9 and 10 or the wedges 11, 12, 15 and 16 engage the walls of the pocket 4. Thus, the driving wheel 1 is cushioned against all blows or shocks which may be transmitted by the quill member 6.

When the driving connection is in service, the arms 8 are constantly effecting a movement at right angles to the driving wheel which is caused by the unevenness of the track traversed. Thus, the surfaces of the arms 8, which engage the wedges 9 and 10, are circular in contour, as illustrated in Fig. 1 of the drawing; in order to permit the quill member to effect a limited movement relative to the driving wheel in planes parallel to the axis of the driving wheel without developing an excess amount of friction between the moving parts.

In the driving connection illustrated in the drawing, the driving wheel is shown with four pockets therein for supporting the wedges and the springs which join the quill member to the driving member but it is to be understood that the driving wheel may be provided with any number of pockets for supporting any desired number of sets of spring connectors. Moreover, any well-known resilient substance may be substituted for the springs shown in the sets of resilient connectors between the quill member and the driven member.

Modifications in the structure and arrangement and location of parts may be made within the spirit and scope of my invention and such modifications are intended to be covered by the appended claims.

I claim as my invention:

1. In a reversible resilient driving connection, the combination with a driving and a driven member, of means comprising a plurality of groups of cushioned wedges for resiliently joining said members, said wedges being located in a plane perpendicular to the axis of rotation of said members.

2. In a reversible resilient driving connection, the combination with a driving and a driven member, of means comprising a plurality of pairs of wedges and a plurality of springs for resiliently joining said members, said wedges being located and operating in a plane perpendicular to the axis of rotation of said members.

3. In a resilient driving connection, the combination with a driven member having a plurality of openings extending therethrough, and a driving member located adjacent to said driven member and having arms which project into the openings in said driven member, of pairs of yieldable wedge-shaped members engaging opposite faces of said arms for resiliently joining said members.

4. In a resilient driving connection, the combination with a quill member having a disk attached thereto and a plurality of arms extending from said disk, of a driving wheel disposed adjacent to said disk, and means comprising pairs of wedge members and a plurality of springs for coöperating with the arms extending from said disk to resiliently connect said quill member to the driving wheel and to oppose relative movement of said wheel and disk in either direction rotarily.

5. In a resilient driving connection, the combination with a quill member having a disk and a plurality of arms projecting laterally from said disk, and a driven member associated with said quill member, of means comprising wedge members having a limited movement at right-angles to said arms for resiliently joining said quill member to the driven member and resisting relative rotary movement of said disk and driven member in either direction.

6. In a resilient driving connection, the combination with a quill member having a disk and a plurality of arms projecting laterally from said disk, and a driven member associated with said quill member, of means comprising a plurality of cushioned wedge members for resiliently joining said quill member to the driven member, said wedge members being arranged in pairs at opposite sides of and having a limited movement at right angles to the arms projecting from said disk.

7. In a resilient driving connection, the combination with a driving and a driven member, of means for joining the driving member to the driven member for rotation in a forward and in a reverse direction and comprising a plurality of cushioned wedges located so that the members effect a limited movement of rotation relative to each other and then establish a rigid connection between the members after such limited movement of rotation.

8. In a resilient driving connection, the combination with a driving and a driven member, of means for resiliently joining the driving member to the driven member for rotation in a forward and in a reverse direction and comprising a plurality of wedges and a plurality of springs.

9. In a resilient driving connection, the combination with a driven member provided with a plurality of pockets therein, and a quill member having a disk disposed adjacent to said driven member and provided with a plurality of laterally projecting arms which extend into the pockets of said driven member, of means comprising a plurality of wedge members on opposite sides of each of said arms, and a plurality of springs associated with said wedge members for resiliently joining said driven member to the quill member.

10. In a resilient driving connection, the combination with a driven member provided with a plurality of pockets therein, and a quill member having a disk disposed adjacent to said driven member and provided with a plurality of laterally projecting arms which extend into the pockets of said driven member, of two wedge members disposed adjacent to each of said arms, two wedge members associated with each of said last mentioned wedge members, and springs coöperating with said last mentioned wedge members for resiliently joining said quill member to the driven member.

In testimony whereof, I have hereunto subscribed my name this 29th day of March, 1917.

VICTOR J. SHEPARD.